United States Patent [19]

Koizumi et al.

[11] 4,335,423

[45] Jun. 15, 1982

[54] TRANSFORMER

[75] Inventors: Akio Koizumi; Hiroshi Nakazawa, both of Tokyo; Akira Endo, Tagajyo, all of Japan

[73] Assignee: Sony Corporation, Tokyo, Japan

[21] Appl. No.: 198,451

[22] Filed: Oct. 20, 1980

[30] Foreign Application Priority Data

Oct. 19, 1979 [JP] Japan ............................ 54-135801

[51] Int. Cl.³ ........................................ H02M 3/335

[52] U.S. Cl. .................................... 363/21; 336/183

[58] Field of Search .................... 336/183; 363/20, 21

[56] References Cited

U.S. PATENT DOCUMENTS

| | | | |
|---|---|---|---|
| 2,791,646 | 5/1957 | Keroes | 336/183 X |
| 3,210,703 | 10/1965 | Lockie | 336/183 |
| 4,156,273 | 5/1979 | Sato | 363/21 X |
| 4,236,198 | 11/1980 | Ohsawa et al. | 363/21 X |

*Primary Examiner*—William M. Shoop

*Attorney, Agent, or Firm*—Lewis H. Eslinger; Alvin Sinderbrand

[57] ABSTRACT

A transformer includes a magnetic core; an input or primary winding structure wound on a bobbin secured to the magnetic core and including first and second primary winding portions; an output or secondary winding structure wound on the bobbin and including first and second secondary winding portions; and a control or tertiary winding structure wound on the bobbin and including first and second tertiary winding portions with the first tertiary winding portion being comprised of first and second windings connected in series, the primary, secondary and tertiary winding structures being wound on the bobbin in the order of the first primary winding portion, the first winding of the first tertiary winding portion, the first secondary winding portion, the second secondary winding portion, the second winding of the first tertiary winding portion, the second primary winding portion, and the second tertiary winding portion, so as to provide a high degree of magnetic coupling between the first primary and secondary winding portions and the first tertiary winding portion and between the second primary and secondary winding portions and the first tertiary winding portion and so as to provide noise suppression between the first primary and secondary winding portions and between the second primary and secondary winding portions.

15 Claims, 4 Drawing Figures

TRANSFORMER

BACKGROUND OF THE INVENTION

1. Field of the Invention

This invention relates to transformers and, more particularly, is directed to a transformer having particular utility with switching regulators.

2. Description of the Prior Art

Conventionally, transformers which are used with switching regulators include a tertiary winding structure, in addition to conventional primary and secondary winding structures. Such tertiary winding structure may be used, for example, for controlling a pulse width modulation (PWM) circuit which controls the power supplied to the primary winding structure. In other words, the voltage across the tertiary winding structure, which is proportional to the voltages across the primary and secondary winding structures, is rectified and used for controlling the operation of the primary winding structure.

However, because of the manner in which the primary, secondary and tertiary winding structures have conventionally been wound about a bobbin secured to a magnetic core of the transformer, there exists an unsatisfactory degree of magnetic coupling between the tertiary winding structure and the primary and secondary winding structures so that the detected voltage from the tertiary winding structure may not reflect, that is, may not be proportional to, the voltages at the primary and second winding structures. For example, in the case where the primary, secondary and tertiary winding structures are comprised of first and second primary, secondary and tertiary winding portions, respectively, it has been known to wind the primary, secondary and tertiary winding structures on the bobbin in the following order: the first primary winding portion, the first tertiary winding portion, the first secondary winding portion, the second secondary winding portion, the second tertiary winding portion, and the second primary winding portion. With such arrangement, the first tertiary winding portion is sandwiched between the first primary and secondary winding portions so as to provide a high degree of magnetic coupling between the first tertiary winding portion and the first primary and secondary winding portions. However, the degree of magnetic coupling between the first tertiary winding portion and the second primary and secondary winding portions is poor. As a result, the transformer may have an unstable characteristic associated therewith and may, in particular circumstances, even produce an undesirable oscillation state. It should therefore be appreciated that, since the magnetic coupling between the first tertiary winding portion and the second primary and secondary winding portions is not high, the tertiary winding structure may not accurately detect a voltage proportional to that of the primary and secondary winding structures.

OBJECTS AND SUMMARY OF THE INVENTION

Accordingly, it is an object of this invention to provide a transformer that avoids the above-described difficulties encountered with the prior art.

More particularly, it is an object of this invention to provide a transformer of the type having a tertiary winding structure, in addition to primary and secondary winding structures, for controlling a pulse width modulation circuit which, in turn, controls the operation of the primary winding structure.

Another object of this invention is to provide a transformer which has a high degree of magnetic coupling between the first winding portion of the tertiary winding structure and the primary and secondary winding structures.

Still another object of this invention is to provide a transformer which acts to suppress noise produced by magnetic interaction between the primary and secondary winding structures.

In accordance with an aspect of this invention, a transformer includes a magnetic core, a primary winding structure associated with the magnetic core and including first and second primary winding portions, a secondary winding structure associated with the magnetic core and including first and second secondary winding portions, and a tertiary winding structure associated with the magnetic core and including first and second tertiary winding portions, the first tertiary winding portion being comprised of first and second windings connected in series and arranged in close proximity to the primary and secondary winding structures so as to provide a high degree of magnetic coupling between the first and second primary and secondary winding portions and the first tertiary winding portion.

In a preferred embodiment of this invention, the primary, secondary and tertiary winding structures are wound on a bobbin in the following order: the first primary winding portion, the first winding of the first tertiary winding portion, the first secondary winding portion, the second secondary winding portion, the second winding of the first tertiary winding portion, the second primary winding portion, and the second tertiary winding portion, so as to provide a high degree of magnetic coupling between the first primary and secondary winding portions and the first winding of the first tertiary winding portion and between the second primary and secondary winding portions and the second winding of the first tertiary winding portion.

The above, and other, objects, features and advantages of the invention, will be apparent in the following detailed description of illustrative embodiments of the invention which is to be read in connection with the accompanying drawings.

DETAILED DESCRIPTION OF A PREFERRED EMBODIMENT

Figure 1:
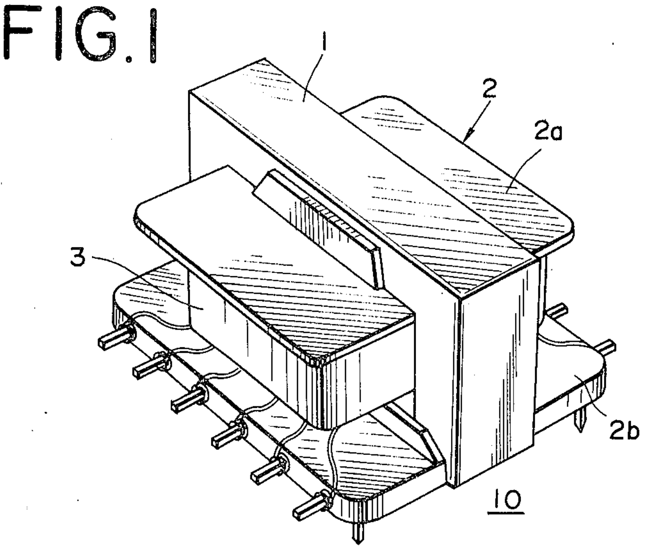
FIG. 1 is a perspective view of a transformer according to this invention.

Referring to the drawings in detail, and initially to FIG. 1 thereof, there is shown a transformer 10 according to the present invention. As shown therein, transformer 10 includes a magnetic core 1 made of ferrite or the like, a bobbin 2 attached to magnetic core 1 and including collars *2a* and *2b*, and a winding structure 3 wound on bobbin 2 between collars 2a and 2b and having respective lead wires. More particularly, as shown in FIG. 2, winding structure 3 includes an input or primary winding structure 11 having first and second winding portions 11a and 11b connected in series, an output or secondary winding structure 12 having first and second winding portions 12a and 12b, and a control or tertiary winding structure 13 used for controlling the energization of primary winding structure 11 and having first and second winding portions 13a and 13b.

Figure 2:
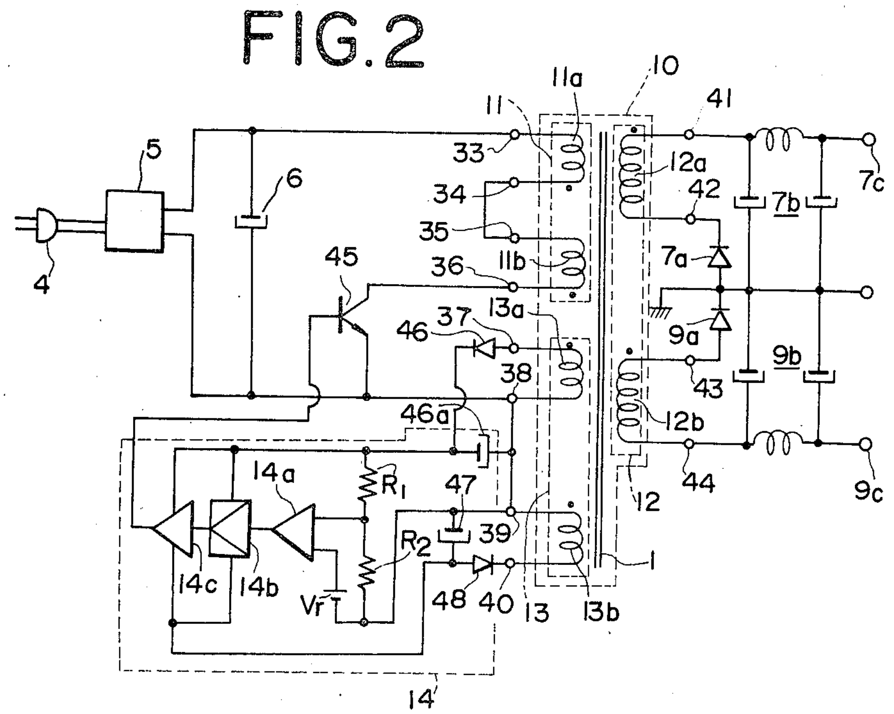
FIG. 2 is a circuit wiring diagram of a switching regulator circuit with which the transformer according to this invention can be used.

The transformer 10 of FIG. 1 finds ready application with a switching regulator, as shown in FIG. 2. The switching regulator includes a rectifying circuit 5 supplied with an AC signal from an AC power source (not shown) through a conventional plug 4. Rectifying circuit 5 converts the AC signal to a DC voltage and supplies the DC voltage to a smoothing condenser 6 connected across the positive and negative output terminals of rectifying circuit 5 and which, in turn, supplies the DC voltage to the primary winding structure 11 of transformer 10. In particular, first winding portion 11a is connected to one end of smoothing condenser 6 and to one end of second winding portion 11b while the other end of second winding portion 11b is connected to the other end of smoothing condenser 6 through the collector-emitter path of an NPN switching transistor 45 which is used for controlling the energization of primary winding structure 11.

A pulse width modulating (PWM) circuit 14 in the switching regulator is used for controlling the switching operation of switching transistor 45 in response to the output from tertiary winding structure 13. In particular, the voltage across first and second winding portions 13a and 13b is rectified for use as positive and negative voltage sources for PWM circuit 14. In this manner, a diode 46 and condenser 46a constitute a first rectifying circuit for rectifying the voltage across first winding portion 13a for supplying a positive voltage to PWM circuit 14. One end of condenser 46a is connected to one end of first winding portion 13a and to the emitter of switching transistor 45, and the other end of first winding portion 13a is connected to the anode of diode 46, the cathode of which is connected to the other end of condenser 46a. In like manner, a diode 48 and condenser 47 constitute a rectifying circuit for rectifying the voltage across second winding portion 13b so as to supply a negative voltage to PWM circuit 14. A first end of condenser 47 is connected to one end of second winding portion 13b and the other end of second winding portion 13b is connected to the cathode of diode 48, the anode of which is connected to the other end of condenser 47. The first end of condenser 47 is also connected to the negative terminal of a voltage source $V_r$ and the positive terminal of such voltage source is connected to one input of a comparator circuit 14a of PWM circuit 14. The other input of comparator circuit 14a is connected to the connection point between capacitor 46a and diode 46 through a voltage divider circuit comprised of resistors $R_1$ and $R_2$. An amplifier 14b of PWM circuit 14 amplifies the compared output signal from comparator circuit 14a and supplies such amplified signal to a drive circuit 14c of PWM circuit 14, the output of drive circuit 14c being supplied to the base of switching transistor 45 for controlling the operation thereof. It should therefore be appreciated that it is essential that the voltage output from tertiary winding 13 bear a close relationship to the voltages produced by primary and secondary winding structures 11 and 12 in order that PWM circuit 14 can accurately control further operation of switching transistor 45 and consequent energization of primary winding structure 11.

As transistor 45 is switched ON and OFF, current through primary winding structure 11 is also switched ON and OFF. Thus, magnetic energy accumulated in the inductance of transformer 10 and, more particularly, in primary winding structure 11 thereof, when transistor 45 is turned ON, is removed at output or secondary winding structure 12 when transistor 45 is turned OFF. The output voltages from first and second winding portions 12a and 12b of secondary winding structure 12 are rectified by diodes 7a and 9a, respectively, and such rectified positive and negative DC voltages are supplied to output terminals 7c and 9c through filters 7b and 9b, respectively.

Figure 3:
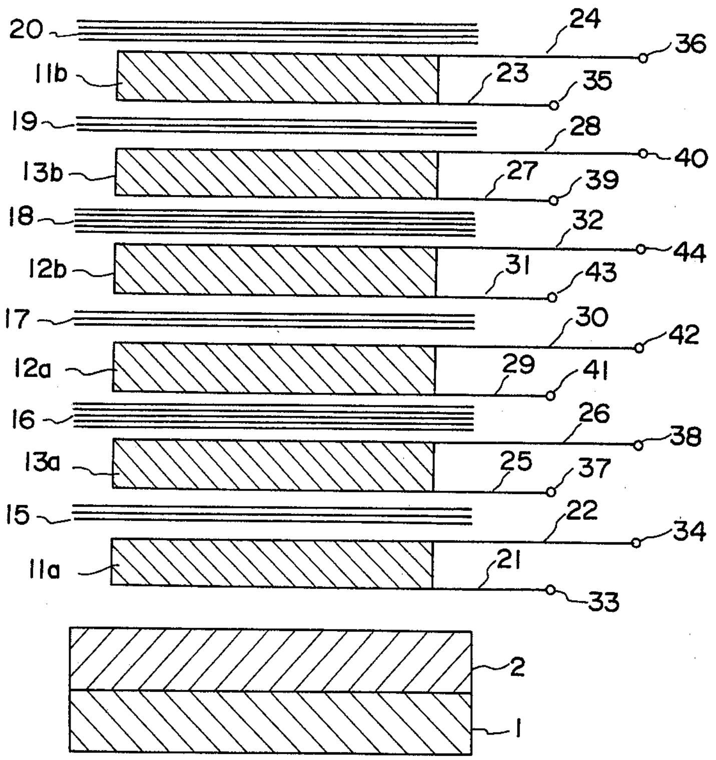
FIG.3 (PRIOR ART)
FIG. 3 is a schematic cross-sectional view of a winding arrangement of a transformer according to the prior art.

Conventionally, it has been known to arrange the primary, secondary and tertiary winding structures as shown in FIG. 3 for use with such switching regulator. In particular, the prior art transformer 10 has a lap winding structure in which the respective winding structures are wound on bobbin 2 secured to magnetic core 1, one on top of the other in the following order: first winding portion 11a of primary winding structure 11, an insulating layer 15, first winding portion 13a of tertiary winding structure 13, an insulating layer 16, first winding portion 12a of secondary winding structure 12, an insulating layer 17, second winding portion 12b of secondary winding structure 12, an insulating layer 18, second winding portion 13b of tertiary winding structure 13, an insulating layer 19, second winding portion 11b of primary winding structure 11 and an insulating layer 20 wound on top of this latter second winding portion 11b. With such arrangement, two lead wires 21 and 22 from first winding portion 11a of primary winding structure 11 are connected to respective terminals 33 and 34 of the switching regulator of FIG. 2, and two lead wires 23 and 24 from second winding portion 11b of primary winding structure 11 are connected to terminals 35 and 36, as shown in FIG. 2, in which terminal 36y constitutes the output or collector terminal of switching transistor 45. In like manner, first winding portion 13a of tertiary winding structure 13 includes a first lead wire 25 connected to the anode of diode 46 at a terminal 37, and a second lead wire 26 connected to one end of condenser 46a, to the emitter of switching transistor 45, and to one end of smoothing condenser 6 at a terminal 38. The second winding portion 13b of tertiary winding structure 13 includes a first lead wire 27 connected to condenser 47 at a terminal 39 and to one input of comparator circuit 14a through voltage source $V_r$, and a second lead wire 28 connected to the cathode of diode 48 at a terminal 40. Also, first winding portion 12a of secondary winding structure 12 includes a first lead wire 29 connected to a terminal 41 and a second lead wire 30 connected to the cathode of diode 7a at a terminal 42. Lastly, the second winding portion 12b of secondary winding structure 12 includes a first lead wire 31 connected to the anode of diode 9a at a terminal 43 and a second lead wire 32 connected to a terminal 44, as shown in FIGS. 2 and 3.

With the winding arrangement in the prior art transformer 10 shown in FIG. 3, first winding portion 13a of tertiary winding structure 13 is sandwiched between first winding portions 11a and 12a of primary and secondary winding structures 11 and 12, respectively, so as to provide a high degree of magnetic coupling between first winding portion 13a and first winding portions 11a and 12*a*. This means that the voltage signal produced by first winding portion 13*a* of tertiary winding structure 13 will be proportional to the voltages at first winding portions 11*a* and 12*a* of primary and secondary winding structures 11 and 12, respectively. Further, because of such sandwiching arrangement, first winding portion 13*a* provides an electrostatic shielding function to suppress noise produced between first winding portion 11*a* of primary winding structure 11 and first winding portion 12*a* of secondary winding structure 12.

However, it is seen that first winding portion 13*a* of tertiary winding structure 13 is remote from second winding portions 11*b* and 12*b* of primary and secondary winding structures 11 and 12, respectively, so as to provide an unsatisfactory degree of magnetic coupling between such first winding portion 13*a* and second winding portions 11*b* and 12*b*. As a result, such prior art transformer may have an unstable characteristic and, depending on the particular circumstances, may even produce undesirable oscillation. It should therefore be appreciated that the voltage from first winding portion 13*a* may not accurately reflect the voltages at second winding portions 11*b* and 12*b*.

Figure 4:
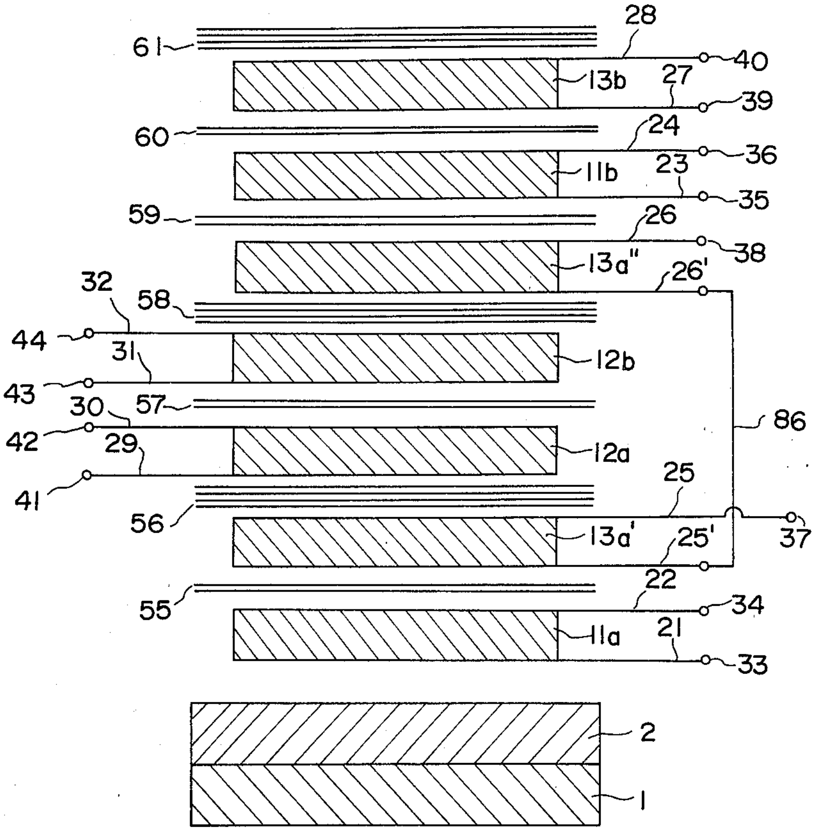
FIG. 4 is a schematic cross-sectional view of a winding arrangement of the transformer according to this invention.

Referring now to FIG. 4, one embodiment of a transformer according to this invention will now be described, with elements corresponding to those described above with reference to the prior art transformer of FIG. 3 being identified by the same reference numerals. In like manner to the arrangement of FIG. 3, the transformer 10 according to the present invention has the primary, secondary and tertiary winding structures 11, 12 and 13 lap wound about a bobbin or spool 2 secured to metal core 1 which is made of, for example, ferrite or the like. The primary, secondary and tertiary winding structures 11, 12 and 13 are comprised of first and second winding portions 11*a* and 11*b*; 12*a* and 12*b*; and 13*a* and 13*b*, respectively. In addition, first winding portion 13*a* of tertiary winding structure 13 is comprised of first and second windings 13*a*' and 13*a*'' connected in series with each other. In accordance with the arrangement of the winding structure according to the present invention, primary, secondary and tertiary winding structures 11, 12 and 13 are wound on bobbin 2 in the following order: first winding portion 11*a* of first winding structure 11; an insulating layer 55; first winding 13*a*' of first winding portion 13*a* of tertiary winding structure 13; an insulating layer 56; first winding portion 12*a* of secondary winding structure 12; an insulating layer 57; second winding portion 12*b* of secondary winding structure 12; an insulating layer 58; second winding 13*a*'' of first winding portion 13*a* of tertiary winding structure 13; an insulating layer 59; second winding portion 11*b* of primary winding structure 11; an insulating layer 60; second winding portion 13*b* of tertiary winding structure 13; and an insulating layer 61 wound thereupon. The lead wires for the first and second winding portions of primary, second and tertiary winding structures 11, 12 and 13 are the same as described previously in regard to the prior art arrangement of FIG. 3 and are connected to the same terminals in FIG. 2 as previously described, with the following exception. Since first winding portion 13*a* of tertiary winding structure 13 is comprised of first and second windings 13*a*' and 13*a*'', lead wire 25 connects terminal 37 to first winding 13*a*' and lead wire 26 connects terminal 38 to second winding 13*a*''. Another lead wire 25' of first winding 13*a*' is connected to a second lead wire 26' of second winding 13*a*'' by a connecting wire 86 so as to electrically connect the two windings 13*a*' and 13*a*'' in series.

With the winding arrangement according to this invention, first winding 13*a*' is sandwiched between first winding portions 11*a* and 12*a* of primary and secondary winding structures 11 and 12, respectively, in the same manner that first winding portion 13*a* of tertiary winding structure 13 was sandwiched between first winding portions 11*a* and 12*a* of primary and secondary winding structures 11 and 12 in the prior art arrangement shown in FIG. 3. In this manner, there exists a high degree of magnetic coupling between first winding portion 13*a* of tertiary winding structure 13 and, in particular, the first winding 13*a*' thereof, and first winding portions 11*a* and 12*a* of primary and secondary winding structures 11 and 12, respectively. Also, such sandwiching relation results in noise suppression between first winding portions 11*a* and 12*a* of primary and secondary winding structures 11 and 12, respectively. In other words, first winding 13*a*' acts to electrostatically shield first winding portions 11*a* and 12*a*.

However, unlike the prior art arrangement shown in FIG. 3, the transformer according to this invention is arranged so that second winding 13*a*'' of first winding portion 13*a* of tertiary winding structure 13 is sandwiched between second winding portions 11*b* and 12*b* of primary and secondary winding structures 11 and 12, respectively. Thus, there exists a high degree of magnetic coupling between second winding 13*a*'' and second winding portions 11*b* and 12*b*, while second winding 13*a*'' also provides an electrostatic shielding function for suppressing noise generated between second winding portions 11*b* and 12*b*. It should therefore be appreciated that the voltage generated at first winding portion 13*a* of tertiary winding structure 13 accurately corresponds to, that is, is proportional to, the voltages at the first and second winding portions of primary and secondary winding structures 11 and 12, so that PWM circuit 14 and switching transistor 45 can accurately control the energization of primary winding structure 11.

It should be appreciated that various modifications within the scope of this invention can be made. For example, while the first and second winding portions 11*a* and 11*b* of primary winding structure 11 are shown to be connected in series, they may be connected in parallel. In such case, a separate switching transistor would be needed for each first winding portion 11*a* and 11*b*.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A transformer comprising:

a magnetic core;

a primary winding structure associated with said magnetic core and including first and second primary winding portions;

a secondary winding structure associated with said magnetic core and including first and second secondary winding portions; and a tertiary winding structure associated with said magnetic core and including first and second tertiary winding portions, said first tertiary winding portion being comprised of first and second windings connected in series and arranged in close proximity to said primary and secondary winding structures so as to provide a high degree of magnetic coupling between the first and second primary and secondary winding portions and the first tertiary winding portion.

2. A transformer according to claim 1; in which said first winding of said first tertiary winding portion is arranged in close proximity to said first primary and secondary winding portions so as to provide a high degree of magnetic coupling between said first primary and secondary winding portions and said first tertiary winding portion, and said second winding of said first tertiary winding portion is arranged in close proximity to said second primary and secondary winding portions so as to provide a high degree of magnetic coupling between said second primary and secondary winding portions and said first tertiary winding portion.

3. A transformer according to claim 2; in which said first winding of said first tertiary winding portion is situated between said first primary and secondary winding portions and said second winding of said first tertiary winding portion is situated between said second primary and secondary winding portions.

4. A transformer according to claim 3; in which said first and second secondary winding portions are situated between said first and second windings of said first tertiary winding portion.

5. A transformer according to claim 4; in which said primary, secondary and tertiary winding structures are wound in said transformer in the following order: said first primary winding portion, said first winding of said first tertiary winding portion, said first secondary winding portion, said second secondary winding portion, said second winding of said first tertiary winding portion, said second primary winding portion, and said second tertiary winding portion.

6. A transformer according to claim 5; further including a bobbin secured to said magnetic core and about which said primary, secondary and tertiary winding structures are wound.

7. A transformer according to claim 5; further including a plurality of insulating layers, each disposed between respective ones of said winding portions.

8. In a switching regulator of the type including a transformer, switching means for controlling the energization of a primary winding structure, and control means for controlling the switching operation of said switching means, said transformer comprising:

a magnetic core;

a said primary winding structure which is associated with said magnetic core and which includes first and second primary winding portions;

a secondary winding structure associated with said magnetic core and including first and second secondary winding portions; and a tertiary winding structure associated with said magnetic core and including first and second tertiary winding portions, said first tertiary winding portion being comprised of first and second windings connected in series and arranged in close proximity to said primary and secondary winding structures so as to provide a high degree of magnetic coupling between the first and second primary and secondary winding portions and the first tertiary winding portion.

9. A switching regulator according to claim 8; further including a DC voltage source and in which said switching means includes a switching transistor having an input and an output path connected between said primary winding structure and said DC voltage source.

10. A switching regulator according to claim 9; in which said first and second tertiary winding portions produce first and second control signals, respectively, in response to the energization of said primary winding structure, and said control means includes comparator means for comparing said first and second control signals and for producing a compared output signal in response thereto, and drive means supplied with said compared output signal for producing a drive signal which is supplied to the input of said switching transistor so as to control the switching operation thereof.

11. A switching regulator according to claim 10; in which said control means further includes first and second rectifying means for rectifying the first and second control signals prior to supplying said first and second control signals to said comparator means.

12. A switching regulator according to claim 8; in which said first winding of said first tertiary winding portion is arranged in close proximity to said first primary and secondary winding portions so as to provide a high degree of magnetic coupling between said first primary and secondary winding portions and said first tertiary winding portion, and said second winding of said first tertiary winding portion is arranged in close proximity to said second primary and secondary winding portions so as to provide a high degree of magnetic coupling between said second primary and secondary winding portions and said first tertiary winding portion.

13. A switching regulator according to claim 12; in which said first winding of said first tertiary winding portion is situated between said first primary and secondary winding portions and said second winding of said first tertiary winding portion is situated between said second primary and secondary winding portions.

14. A switching regulator according to claim 13; in which said first and second secondary winding portions are situated between said first and second windings of said first tertiary winding portion.

15. A switching regulator according to claim 14; in which said primary, secondary and tertiary winding structures are wound in said transformer in the following order: said first primary winding portion, said first winding of said first tertiary winding portion, said first secondary winding portion, said second secondary winding portion, said second winding of said first tertiary winding portion, said second primary winding portion, and said second tertiary winding portion.

* * * * *